(12) United States Patent
Djega-Mariadassou et al.

(10) Patent No.: US 7,262,149 B2
(45) Date of Patent: Aug. 28, 2007

(54) METHOD FOR CATALYTIC TREATMENT OF A GAS FOR REDUCING NITROGEN OXIDE EMISSION

(75) Inventors: Gérald Djega-Mariadassou, Igny (FR); Cyril Thomas, Paris (FR); Olivier Gorce, Chatou (FR)

(73) Assignee: Universite Pierre et Marie Curie, Paris IV, Paris (FR)

( * ) Notice: Subject to any disclaimer, the term of this patent is extended or adjusted under 35 U.S.C. 154(b) by 499 days.

(21) Appl. No.: 10/333,717

(22) PCT Filed: Jul. 9, 2001

(86) PCT No.: PCT/FR01/02201

§ 371 (c)(1), (2), (4) Date: Jul. 22, 2003

(87) PCT Pub. No.: WO02/07864

PCT Pub. Date: Jan. 31, 2002

(65) Prior Publication Data

US 2004/0014599 A1 Jan. 22, 2004

(30) Foreign Application Priority Data

Jul. 24, 2000 (FR) .................. 00 09678

(51) Int. Cl.
*B01J 23/00* (2006.01)
(52) U.S. Cl. ................... 502/304
(58) Field of Classification Search ............. 423/235, 423/239.1; 502/304
See application file for complete search history.

(56) References Cited

U.S. PATENT DOCUMENTS

| 4,587,231 | A | | 5/1986 | Sawamura et al. |
| 4,940,685 | A | | 7/1990 | Sauvion et al. |
| 5,164,350 | A | * | 11/1992 | Abe et al. ................. 502/66 |
| 5,733,837 | A | * | 3/1998 | Nakatsuji et al. ......... 502/304 |
| 5,908,800 | A | | 6/1999 | Bonneau et al. |
| 5,968,463 | A | * | 10/1999 | Shelef et al. ............. 423/213.5 |
| 6,093,378 | A | * | 7/2000 | Deeba et al. ............. 423/213.5 |
| 6,228,799 | B1 | | 5/2001 | Aubert et al. |
| 6,419,890 | B1 | * | 7/2002 | Li ......................... 423/239.1 |

FOREIGN PATENT DOCUMENTS

| AU | 52347/93 | 6/1994 |
| EP | 0207857 A2 | 1/1987 |
| EP | 0 337 809 | 10/1989 |
| EP | 0 427 493 | 5/1991 |
| EP | 0605274 A1 | 7/1994 |
| EP | 0 637 461 | 2/1995 |
| EP | 0735984 B1 | 3/1998 |
| EP | 0906244 B1 | 1/2002 |
| WO | 95/18068 A1 | 7/1995 |
| WO | 97/43214 | 11/1997 |

OTHER PUBLICATIONS

Fajardie et al, Benzene Hydrogenation as a Tool for the Determination of the Percentage of Metal Exposed on Low Loaded Ceria Supported Rhodium Catalysts, *Journal of Catalysis* 163, 77-86 (1996), published by Academic Press, Inc., New York, N.Y.

* cited by examiner

*Primary Examiner*—Edward M. Johnson
(74) *Attorney, Agent, or Firm*—Buchanan, Ingersoll & Rooney, PC

(57) ABSTRACT

A method and catalytic systems for treating a gas to reduce nitrogen oxide emissions are disclosed. The catalytic systems can include a catalytic composition which comprises an active phase on a support. The active phase is based on rhodium in the form $RH^{x+}$ and at least another element selected among palladium and platinum and the support is based on cerium oxide and zirconium oxide. Gases capable of being treated by the method and the catalytic systems include in particular those derived from gas turbines, from gas-fired or coal-fired stream plant boilers, or from internal combustion engines.

14 Claims, No Drawings

METHOD FOR CATALYTIC TREATMENT OF A GAS FOR REDUCING NITROGEN OXIDE EMISSION

The present invention relates to a method of treatment of a gas for reduction of nitrogen oxides emission, with a catalyst based on rhodium with palladium and/or platinum.

It is known that the reduction of nitrogen oxides (NOx) emissions of automobile exhaust gases is performed using "three-way" catalysts which stoichiometrically use the reducing gases present in the mixture. Any excess of oxygen results in a severe deterioration of the catalyst performance.

Certain engines, such as diesel, or gasoline engines operating with a lean mixture (lean burn), are economical in fuel but emit exhaust gases which continually contain a large excess of oxygen, for example at least 5%. A standard three-way catalyst is thus without significant effect on the NOx emissions of these engines. Furthermore, the limitation of NOx emissions has become imperative because of the tightening of the automobile post-combustion standards now applying to this type of engine.

There is thus a real need for an effective catalyst for the reduction of NOx emissions for this type of engine and, more generally, for the treatment of gases containing NOx.

The object of the invention is thus to find a catalyst which can be used for the treatment of such gases.

With this purpose, the method of the invention for the treatment of a gas having a high oxygen content in order to reduce emission of nitrogen oxides is a method using a catalytic composition comprising an active phase on a support, and it is characterized in that the active phase is based on rhodium in the form of $Rh^{x+}$ and at least one other element chosen from among palladium and platinum, and in that the support is based on cerium oxide and zirconium oxide.

Other characteristics, details and advantages of the invention will become apparent on reading the following description as well as various specific, but not limiting, examples intended to illustrate it.

The compositions used in the invention comprise an active phase and a support. The term "support" should be taken in a wide sense to indicate, in the composition, the predominant element(s) and/or those without their own catalytic activity, or having a catalytic activity not equivalent to that of the active phase, and on which the other elements are deposited. For simplicity, "support" and "active phase" or "supported phase" will be used in the following description, but it will be understood that the scope of the invention will not be departed from in the case where an element described as belonging to the active or supported phase is present in the support, having been introduced, for example, during the preparation of the support itself.

The active phase is based on rhodium and at least one other element chosen from among palladium and platinum. In the following description, the term "other element" will consequently be applied, not only to the case of palladium alone or platinum alone, but also to the combination of these two elements, which combination may be in any proportions.

According to a specific alternative of the invention, the other element is palladium.

According to one of the characteristics of the invention, rhodium is present in the catalytic composition in the form $Rh^{x+}$. In the meaning of the present invention, $Rh^{x+}$ is intended to mean the different possible oxidation states of rhodium and others which rhodium reduces to the 0 oxidation state, and the fact that the rhodium is superficially inserted into the network of the support. Rhodium present in the form $Rh_2O_3$, for example, is excluded from this definition. According to an advantageous embodiment of the invention, the rhodium is essentially in the form $Rh^{x+}$. This is understood to mean that at least 90%, and more particularly at least 95%, of the rhodium of the catalytic composition is present in this form. According to a preferred embodiment of the invention, the rhodium is wholly present (100%) in the $Rh^{x+}$ form.

The determination of the quantity of rhodium in the $Rh^{x+}$ form can be performed by a method using chemisorption of nitric monoxide. This method comprises, in a first step, a pretreatment of the catalyst from the ambient temperature to 500° C. with the stoichiometric reaction mixture $CO-NO-O_2$ or with the mixture $CO-O_2$ having an excess of CO, or else with $H_2$. When the temperature of 500° C. is reached, the reactor is purged under He, then cooled to ambient temperature again. In a second step, adsorption of NO diluted with helium is performed. Thus the sample is exposed at ambient temperature to a mixture of 0.2% by volume of NO diluted in helium (15 L·h$^{-1}$) until the NO signal is stabilized. The reactor is then purged until the NO is completely eliminated from the reaction enclosure. The method then comprises a third step of thermo-desorption of NO. The catalyst is heated under a stream of $CO-O_2$ (1.5 vol. % of CO, 0.65 vol. % of $O_2$, in helium, 15 L·h$^{-1}$) from 25° C. to 500° C.

A desorption profile is obtained by this method, and from this profile there is determined the quantity of NO which desorbs under the desorption peak which appears at the moment of "light-off" (temperature corresponding to 50% conversion of CO) of the $CO-O_2$ reaction toward 200° C.; a titration stoichiometry of NO:Rh=2 is used to denumerate the $Rh^{x+}$ sites.

The determination of the quantity of rhodium in the Rh(0) state can be performed by a benzene hydrogenation test at 50° C. Such a test is described in the article "Benzene Hydrogenation as a Tool for Determination of the Percentage of Metal Exposed on Low Loaded Ceria Supported Rhodium Catalysts," F. Fajardie et al., Journal of Catalysis 163, 77-86 (1996).

The preferred embodiment mentioned hereinabove, in which rhodium is present totally (100%) in the $Rh^{x+}$ form, corresponding to the case in which the value of 100% is obtained by the first method (titration by chemisorption of NO) which has just been described hereinabove and the value of 0% of Rh(0) by the second method (benzene hydrogenation), taking into account their limits of accuracy.

The respective proportions of rhodium and of the other element of the catalytic phase can vary. Preferably, however, the atomic ratio of the other element to rhodium is at least 1, more particularly at least 1.5, and still more particularly, at least 3.

Furthermore, the other element is preferably present in the catalytic composition in the form of oxide, for example as PdO in the case of palladium.

The invention covers the case in which the active phase essentially consists of rhodium and one or two other elements platinum and palladium. By "essentially consists" is to be understood that the active phase of the composition contains no element other than rhodium, platinum and palladium, such as, for example, an element of the precious metal type, or other transition metal usually used in catalysis and which could have catalytic activity for the elimination of NOx.

The support of the composition is based on cerium oxide and zirconium oxide. More specifically, supports could be used in which the weight ratio of cerium oxide to zirconium oxide is comprised between 1/9 and 9/1. Preferably, supports are used in which the cerium oxide is predominant, for example a proportion of cerium oxide of at least 60% with respect to the whole support. Finally, the invention relates to the case where the support is solely constituted by a mixture of the oxides of cerium and zirconium.

By way of example, a support based on cerium oxide stabilized by zirconium oxide can be used, such as described in the patent application EP-A-207857.

There can also be mentioned the compositions based on cerium oxide and zirconium oxide described in the patent applications EP-A-605274, EP-A-735984 and WO 97/43214, the teaching of which is incorporated herein by reference. More particularly, supports can be used which occur as a solid solution. In this case, the X-ray diffraction diagrams of the support reveal the existence of a single homogeneous phase within the latter. For supports richer in cerium, this phase in fact corresponds to that of a crystallized cubic ceric oxide $CeO_2$ whose lattice parameters vary with respect to a pure ceric oxide, thus manifesting the incorporation of zirconium into the crystal lattice of the cerium oxide, and thus a true solid solution having been obtained. Compositions based on cerium and zirconium oxides can also be used in which these oxides are present in a cerium/zirconium atom proportion of at least 1.

The invention is also applied to the use of catalytic compositions obtained according to specific preparation methods.

Thus a composition can be used for which the rhodium has been deposited on the support by anion exchange. In this case, a suspension of the support is formed in water, and the suspension is brought below the isoelectric point of the support oxides, generally by the addition of acid. A solution of a rhodium salt, for example a chloride, at the same pH as that of the suspension, is then added to the suspension. Agitation is maintained after the addition of the solution, followed by filtration and washing.

However, other known methods could be used for the deposition of rhodium on the support. Specifically, the methods of impregnation with nascent humidity, by cation exchange, by precipitation, or by vapor phase deposition can be mentioned.

Another method of preparation can be described for the compositions corresponding to the preferred embodiments of the invention.

This method is a method in which rhodium is deposited on the support, then the product obtained is heat treated in the presence of a reducing gas, and the other said element is subsequently deposited on the support comprising the rhodium.

The deposition of rhodium can be performed by the methods mentioned hereinabove. The heat treatment which follows the deposition is usually performed at a temperature comprised between 100° C. and 600° C., preferably between 300° C. and 500° C. The reducing gas can be pure hydrogen or pure carbon monoxide or a mixture of these, or else one or both of these gases mixed with an inert gas.

At the conclusion of the heat treatment, the other element, palladium or platinum, is then deposited on the support, using a deposition method of the type of these described hereinabove. After this deposition, calcination of the composition in air is usually carried out, at a temperature which can be between 200° C. and 600° C., more particularly between 300° C. and 500° C.

The compositions obtained by the methods just described are generally in the form of powders but may if necessary be shaped into granules, beads, extrusions, cylinders or honeycombs of varied dimensions.

The gases which can be treated by the method of the present invention are, for example, those from gas turbines, boilers of gas or coal power plants, or moreover from internal combustion engines.

The compositions of the invention can be more specifically used for gases which have a high oxygen content. By gases having a high oxygen content is meant gases having an excess of oxygen with respect to the quantity necessary for the stoichiometric combustion of the fuel and, more specifically, gases having an excess of oxygen with respect to the stoichiometric value $\lambda=1$, that is, gases for which the value of $\lambda$ is greater than 1. The value $\lambda$ is correlated in a manner known per se with the air/fuel ratio, particularly in the field of internal combustion engines. Such gases can be those of an engine operating with a lean mixture (lean burn) and having an oxygen content (expressed by volume) of, for example, at least 2%, as well as those which have a still higher oxygen content, for example, gases from diesel engines, that is, at least 5% or more than 5%, more particularly less than 10%, this content possibly being, for example, situated between 5% and 20%.

The invention is also applied to gases of the above type which can furthermore contain water in an amount of 1% to 15% by volume, for example.

The gases can contain hydrocarbons, and in such a case one of the reactions which it is desired to catalyze is the reaction HC (hydrocarbons)+NOx.

The hydrocarbons which can be used as reducing agents for the elimination of NOx are specifically gases or liquids of the groups of saturated hydrocarbons, ethylenic hydrocarbons, acetylenic hydrocarbons, aromatic hydrocarbons, and hydrocarbons of petroleum fractions such as for example methane, ethane, propane, butane, pentane, hexane, ethylene, butene, propylene, acetylene, butadiene, benzene, toluene, xylene, kerosene and diesel oil.

The gases can also contain oxygen-containing organic compounds as reducing agents. These compounds can specifically be alcohols, for example saturated alcohols such as methanol, ethanol or propanol; ethers, such as methyl ether or ethyl ether; esters such as methyl acetate; and ketones.

The invention also concerns a system for gas treatment for the reduction of emissions of nitrogen oxides; the gases can be of the type previously mentioned and quite particularly those having an excess of oxygen with respect to the stoichiometric value. This system is characterized in that it comprises a composition such as described hereinabove. Thus, it can comprise a coating (wash coat) having catalytic properties and based on these compositions, on a substrate, for example, of the monolithic metallic or ceramic type.

Finally, the invention also relates to the use of the compositions in the manufacture of such a system.

Example will now be given.

Compositions are used in these examples whose support is a mixture of cerium oxide and zirconium oxide of the type in Example 1 of the patent application EP-A-906244, that is, in the respective proportions by weight of 75% and 25%, or atomic proportions of 62% and 38%, of cerium and zirconium.

This support has been calcined before use for 2 hours at 500° C. under a gas stream of $O_2(20\%)$—$N_2$ (80%) at 15 NL/h.

The gas mixture treated with the exemplary compositions is as follows:

NO: 340 vol. ppm
O$_2$: 8 vol. %.
C$_3$H$_6$: 1,900 vol. ppm
N$_2$: complement to 100% volume
VVH: variable according to the examples
H$_2$O: variable according to the examples The quantity of catalyst used is 200 mg, and the gas throughput is 15 NL/h.

EXAMPLE 1

Rhodium is deposited on 2.5 g of support by anion exchange of RhCl$_3$ at pH 1.9. After deposition of the rhodium, the composition is heat treated for 2 hours at 500° C. under 100 cm$^3$/min of H$_2$.

Palladium is then deposited on the thus treated composition. The method of deposition used is impregnation of PdCl$_2$ in aqueous solution by nascent humidity. Calcination in air at 500° C. is then performed for 2 hours at a flow rate of 100 cm$^3$/min.

EXAMPLE 2

The method is as in Example 1, but instead of the said heat treatment, the composition is subjected to a calcination for 2 hours at 500° C. under 100 cm$^3$/min of industrial air.

EXAMPLE 3

The method is as in Example 1, but the rhodium is deposited by impregnation by nascent humidity by an aqueous solution of RhCl$_3$.

EXAMPLE 4

The method is as in Example 1, but instead of palladium, platinum is deposited by impregnation by nascent humidity by an aqueous solution of H$_2$PtCl$_6$.

EXAMPLES 5 AND 6

The method is as in Example 1, but the Pd/Rh ratio is varied.

EXAMPLES 7-9

The method is as in Example 1, but with a different Pd/Rh ratio. The catalyst is used under different VVH and water content conditions.

EXAMPLE 10

The method is as in Example 1, but the catalyst obtained is tested under conditions different from those of that example.

In the table are shown the results obtained when treating the gas mixture mentioned hereinabove with the compositions obtained according to the methods described in the examples.

The abbreviations in the Table have the following meanings:

M denotes palladium or platinum;
% Rh and % M denote the percentages by unit weight of Rh and M with respect to the whole composition, these contents having been determined after calcination at 500° C.;
the M/Rh ratio is an atomic ratio;
PME denotes the percentage of reduced metal Rh exposed (in the 0 oxidation state) determined by the benzene hydrogenation test at 50° C.

The conversion was determined isothermally at the indicated temperature at the time t=6 hours.

| Example | % Rh | % M | Ratio M/Rh | PME (%) | H$_2$O (% vol) | VVH (h$^{-1}$) | Conversion of NOx into N$_2$ |
|---|---|---|---|---|---|---|---|
| 1 | 0.44 | 0.54 | 1.2 | 0 | 0 | 112500 | 23% - 265° C. |
| 2 | 0.30 | 0.50 | 1.6 | 5.7 | 0 | 112500 | 18% - 265° C. |
| 3 | 0.40 | 0.50 | 1.2 | 0 | 0 | 112500 | 23% - 245° C. |
| 4 | 0.41 | 0.92 | 1.2 | 3.2 | 0 | 112500 | 21% - 265° C. |
| 5 | 0.37 | 0.34 | 0.9 | 0 | 0 | 112500 | 17% - 300° C. |
| 6 | 0.46 | 0.61 | 1.3 | 0 | 0 | 112500 | 28% - 265° C. |
| 7 | 0.29 | 1.26 | 4.2 | 0 | 0 | 112500 | 42% - 265° C. |
| 8 | 0.29 | 1.26 | 4.2 | 0 | 4 | 112500 | 35% - 265° C. |
| 9 | 0.29 | 1.26 | 4.2 | 0 | 0 | 67500 | 46% - 265° C. |
| 10* | 0.44 | 0.54 | 1.2 | 0 | 2 | 45000 | 36% - 265° C. |

*For trial 10, the conversion obtained at time t = 22 hours is the same as that shown in the Table, which shows the stability of the catalyst.

The invention claimed is:

1. A catalytic system for the catalytic treatment of a gas having a high oxygen content for the reduction of emission of nitrogen oxides therefrom, said system comprising therein a catalytic composition having an active phase on a support, said active phase comprising rhodium in the form of Rh$^{x+}$ and at least one other element selected from the group consisting of palladium and platinum, said support comprising cerium oxide and zirconium oxide, wherein the proportion of the cerium oxide is at least 60% by weight with respect to the total weight of the support.

2. The catalytic system according to claim 1, wherein the rhodium is essentially in the form Rh$^{x+}$.

3. The catalytic system according to claim 1, wherein said active phase consisting essentially of rhodium in the form of Rh$^{x+}$ and at least one other element selected from the group consisting of palladium and platinum.

4. The catalytic system according to claim 1, wherein the atomic ratio of said at least one other element to rhodium is at least one.

5. The catalytic system according to claim 2, wherein the atomic ratio of said at least one other element to rhodium is at least one.

6. The catalytic system according to claim 3, wherein the atomic ratio of said at least one other element to rhodium is at least one.

7. A method for manufacturing a catalytic system for the catalytic treatment of a gas having a high oxygen content for the reduction of emission of nitrogen oxides therefrom, said method comprising incorporating therein a catalytic composition according to claim 1.

8. A method for manufacturing a catalytic system for the catalytic treatment of a gas having a high oxygen content for the reduction of emission of nitrogen oxides therefrom, said method comprising incorporating therein a catalytic composition according to claim 2.

9. A method for manufacturing a catalytic system for the catalytic treatment of a gas having a high oxygen content for the reduction of emission of nitrogen oxides therefrom, said method comprising incorporating therein a catalytic composition according to claim 3.

10. A method for manufacturing a catalytic system for the catalytic treatment of a gas having a high oxygen content for the reduction of emission of nitrogen oxides therefrom, said method comprising incorporating therein a catalytic composition according to claim 4.

11. A method for manufacturing a catalytic system for the catalytic treatment of a gas having a high oxygen content for the reduction of emission of nitrogen oxides therefrom, said method comprising incorporating therein a catalytic composition according to claim 5.

12. A method for manufacturing a catalytic system for the catalytic treatment of a gas having a high oxygen content for the reduction of emission of nitrogen oxides therefrom, said method comprising incorporating therein a catalytic composition according to claim 6.

13. The catalytic system according to claim 1, wherein said support consists essentially of cerium oxide and zirconium oxide.

14. The catalytic system according to claim 1, wherein said support consists essentially of cerium oxide and zirconium oxide.

* * * * *

UNITED STATES PATENT AND TRADEMARK OFFICE
CERTIFICATE OF CORRECTION

PATENT NO. : 7,262,149 B2 Page 1 of 1
APPLICATION NO. : 10/333717
DATED : August 28, 2007
INVENTOR(S) : Djega-Mariadassou et al.

It is certified that error appears in the above-identified patent and that said Letters Patent is hereby corrected as shown below:

On the cover page of the patent, first column, under (73) Assignee, change "Paris IV" to read --Paris VI--.

Signed and Sealed this

Sixth Day of January, 2009

JON W. DUDAS
*Director of the United States Patent and Trademark Office*